United States Patent
Son

(10) Patent No.: US 10,065,470 B2
(45) Date of Patent: Sep. 4, 2018

(54) SUSPENSION OF FRONT DOUBLE-AXLE VEHICLE

(71) Applicant: Hyundai Motor Company, Seoul (KR)

(72) Inventor: Tae Young Son, Seoul (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 15/137,456

(22) Filed: Apr. 25, 2016

(65) Prior Publication Data

US 2017/0144498 A1    May 25, 2017

(30) Foreign Application Priority Data

Nov. 20, 2015  (KR) .................. 10-2015-0162912

(51) Int. Cl.
*B60G 5/047* (2006.01)
*B60G 11/04* (2006.01)
*B60G 11/10* (2006.01)

(52) U.S. Cl.
CPC .............. *B60G 5/047* (2013.01); *B60G 11/04* (2013.01); *B60G 11/10* (2013.01); *B60G 2204/121* (2013.01); *B60G 2204/421* (2013.01)

(58) Field of Classification Search
CPC . B60G 5/04; B60G 5/047; B60G 5/06; B60G 11/04; B60G 11/10; B60G 21/02; B60G 21/023; B60G 21/04; B60G 21/045; B60G 2204/121; B60G 2204/421; B60G 2204/41044

See application file for complete search history.

(56) References Cited

U.S. PATENT DOCUMENTS

| | | | | |
|---|---|---|---|---|
| 1,536,981 A | * | 5/1925 | Stossel | B60G 7/005 267/266 |
| 1,684,692 A | * | 9/1928 | Adye | B60G 21/04 280/104 |
| 1,694,422 A | * | 12/1928 | Leytens | B60G 5/047 180/22 |
| 1,745,433 A | * | 2/1930 | Marcum | B60G 5/047 267/46 |

(Continued)

FOREIGN PATENT DOCUMENTS

| | | |
|---|---|---|
| JP | H05169945 A | 7/1993 |
| JP | 2003-146039 A | 5/2003 |

(Continued)

*Primary Examiner* — Barry Gooden, Jr.
(74) *Attorney, Agent, or Firm* — Mintz Levin Cohn Ferris Glovsky and Popeo, P.C.; Peter F. Corless

(57) ABSTRACT

A suspension for a front double-axle vehicle is provided in which when an axial load is input from either a first front axle or a second front axle, the axial load is transmitted and dispersed to the other axle. The suspension includes an intermediate bracket that is disposed between a front leaf spring coupled to the first front axle and a rear leaf spring coupled to the second front axle. A front shackle is rotatably coupled at a first end thereof to a rear end of the front leaf spring. Additionally, a connector is rotatably coupled at a first end thereof to a second end of the front shackle and at a second end thereof to a front eye end of the rear leaf spring, and is rotatably coupled to the intermediate bracket at an intermediate portion thereof between the first and second ends.

6 Claims, 4 Drawing Sheets

(56) References Cited

U.S. PATENT DOCUMENTS

| | | | | |
|---|---|---|---|---|
| 2,451,293 | A * | 10/1948 | Long | B60G 5/047 280/682 |
| 3,608,923 | A * | 9/1971 | Houfek, Sr. | B60G 5/04 180/24.02 |
| 3,767,222 | A * | 10/1973 | Willetts | B60G 5/04 267/136 |
| 3,833,236 | A * | 9/1974 | Davis | B60G 5/047 267/262 |
| 4,676,523 | A * | 6/1987 | Rogers | B60G 5/04 280/682 |
| 5,234,067 | A * | 8/1993 | Simard | B60G 5/01 180/24.01 |
| 5,526,895 | A * | 6/1996 | Shin | B60G 5/047 180/236 |
| 5,662,314 | A * | 9/1997 | Stoltzfus | B60G 5/00 267/271 |
| 6,220,580 | B1 * | 4/2001 | Balczun | B60G 5/053 267/6 |
| 6,382,659 | B1 * | 5/2002 | Simard | B60G 5/047 280/104 |
| 6,478,321 | B1 * | 11/2002 | Heitzmann | B60G 5/047 267/219 |
| 8,459,676 | B2 * | 6/2013 | Heimann | B60G 11/08 267/7 |
| 2004/0119260 | A1 * | 6/2004 | Fenton | B60G 5/00 280/124.174 |
| 2008/0036182 | A1 * | 2/2008 | Fenton | B60G 5/00 280/682 |
| 2008/0164645 | A1 | 7/2008 | Bost et al. | |
| 2009/0250907 | A1 * | 10/2009 | Preijert | B60G 5/047 280/682 |
| 2013/0147146 | A1 * | 6/2013 | Dunlap | B60G 5/04 280/124.116 |

FOREIGN PATENT DOCUMENTS

| | | |
|---|---|---|
| KR | 2009-0062206 A | 6/2009 |
| KR | 2010-0043734 A | 4/2010 |

* cited by examiner

SUSPENSION OF FRONT DOUBLE-AXLE VEHICLE

CROSS REFERENCE TO RELATED APPLICATION

The present application claims priority of Korean Patent Application No. 10-2015-0162912 filed on Nov. 20, 2015, the entire contents of which is incorporated herein for all purposes by this reference.

BACKGROUND

Field of the Invention

The present invention relates to a suspension for a front double-axle vehicle, and more particularly to a suspension for a front double-axle vehicle that reduces an axial load deviation between a first front axle and a second front axle and improves the ride comfort of the vehicle.

Description of the Related Art

As shown in FIGS. 1 and 2 of the related art, a front axle 1 for a commercial vehicle is an axle that is disposed at a front side of the vehicle and is capable of steering the vehicle, and a rear axle 2 is a drive axle for transmission of power. A front axle 1 for some large trucks is formed of two axles including a first front axle 1a and a second front axle 1b. A front leaf spring 3 and a rear leaf spring 4 that operate as suspensions for the first front axle 1a and the second front axle 1b are configured to be independently operated.

In particular, an eye end 3a of the front leaf spring 3 that corresponds to a front end of the front leaf spring 3 is coupled to a first front bracket 6 mounted to a vehicle body frame 5. A rear end of the front leaf spring 3 is coupled to a front shackle 7 and the front shackle 7 is coupled to a second front bracket 8 mounted to the vehicle body frame 5. An eye end 4a of the rear leaf spring 4 that corresponds to a front end of the rear leaf spring 4 is coupled to a first rear bracket 9 mounted to the vehicle body frame 5. A rear end of the rear leaf spring 4 is coupled to a rear shackle 100 and the rear shackle 100 is coupled to a second rear bracket 111 mounted to the vehicle body frame 5.

When an imbalance between the first front axle 1a and the second front axle 1b is caused by a change in spring constants of the front and rear leaf springs 3 and 4, or a change in camber in an unloaded state, etc., a deviation between axial loads of the first front axle 1a and the second front axle 1b is generated. The conventional suspension, in which the front leaf spring 3 and the rear leaf spring 4 are operated independently, does not have any structure capable of reducing an axial load deviation between the first front axle 1a and the second front axle 1b. Therefore, there is a disadvantage in that with the lapse of time, the axial load deviation between the first front axle 1a and the second front axle 1b is exacerbated, thus causing reduction in the steerability and the safety of the vehicle. Furthermore, due to a difference in tire wear rate between the first front axle 1a and the second front axle 1b, the drive stability may be reduced, and the tire replacement period may be shortened.

The foregoing is intended merely to aid in the understanding of the background of the present invention, and is not intended to mean that the present invention falls within the purview of the related art that is already known to those skilled in the art.

SUMMARY

Accordingly, the present invention provides a suspension for a front double-axle vehicle which is improved to have a structure in which a rear end of a front leaf spring and a front end of a real leaf spring are coupled to each other to be rotatable relative to a vehicle body frame and thus, when an axial load deviation between a first front axle and a second front axle is caused, the axial load deviation may be reduced, thus enhancing the steerability, the safety and the drive stability of the vehicle and, moreover, extending a tire replacement period based on a tire wear rate. Additionally, the present invention provides a suspension for a front double-axle vehicle in which a bushing is disposed on a junction between the rear end of the front leaf spring and the front end of the rear leaf spring, thus improving the ride comfort of the vehicle.

According to one aspect, a suspension for a front double-axle vehicle, may include: an intermediate bracket disposed between a front leaf spring coupled to a first front axle and a rear leaf spring coupled to a second front axle, the intermediate bracket being fixedly installed on a vehicle body frame; a front shackle rotatably coupled at a first end thereof to a rear end of the front leaf spring; and a connector rotatably coupled at a first end thereof to a second end of the front shackle and at a second end thereof to a front eye end of the rear leaf spring, the connector being rotatably coupled to the intermediate bracket at an intermediate portion thereof between the first and second ends.

The intermediate bracket may be fixedly coupled at an upper end thereof to the vehicle body frame and includes in a lower end thereof a coupling aperture through which the connector may be coupled to the intermediate bracket. The coupling aperture may include a front aperture and a rear aperture that communicate with an exterior. The connector may include: a cross beam having a central part with a circular cross-section, a front rod that protrudes forward from the central part and is coupled to the front shackle, and a rear rod that protrudes rearward from the central part and is coupled to the front eye end of the rear leaf spring; a rubber bushing coupled to an outer circumferential surface of the central part; and a bushing pipe coupled to an outer circumferential surface of the rubber bushing. The bushing pipe may be coupled to the coupling aperture of the intermediate bracket. The front rod and the rear rod may be installed to respectively pass through the front aperture and the rear aperture of the intermediate bracket.

The suspension may further include an upper stopper and a lower stopper coupled to upper and lower surfaces of the front rod and upper and lower surfaces of the rear rod and thus, when the central part rotates, the upper stopper and the lower stopper come into contact with the intermediate bracket. The suspension may further include an adjustment bolt disposed on a side portion of the central part and threadedly coupled to the intermediate bracket across the coupling aperture.

Furthermore, when an axial load is input from either the first front axle or the second front axle, the central part may be configured to rotate while the rubber bushing is elastically deformed, and the axial load may be dispersed to the other front axle by the rotation of the central part. In a suspension for a front double-axle vehicle according to the present invention, when an axial load is input from either a first front axle or a second front axle, the axial load may be transmitted to the other axle to allow the axial load to be dispersed. Therefore, an axial load deviation between the first front axle and the second front axle may be reduced. Thereby, the steerability, the safety and the drive stability may be enhanced. Moreover, a tire wear rate may be reduced, thus allowing a tire replacement period to be extended. Furthermore, in the present invention, since a cross beam connecting a front leaf spring and a rear leaf spring may be installed with a rubber bushing, there is an advantage in that the ride comfort of the vehicle may be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
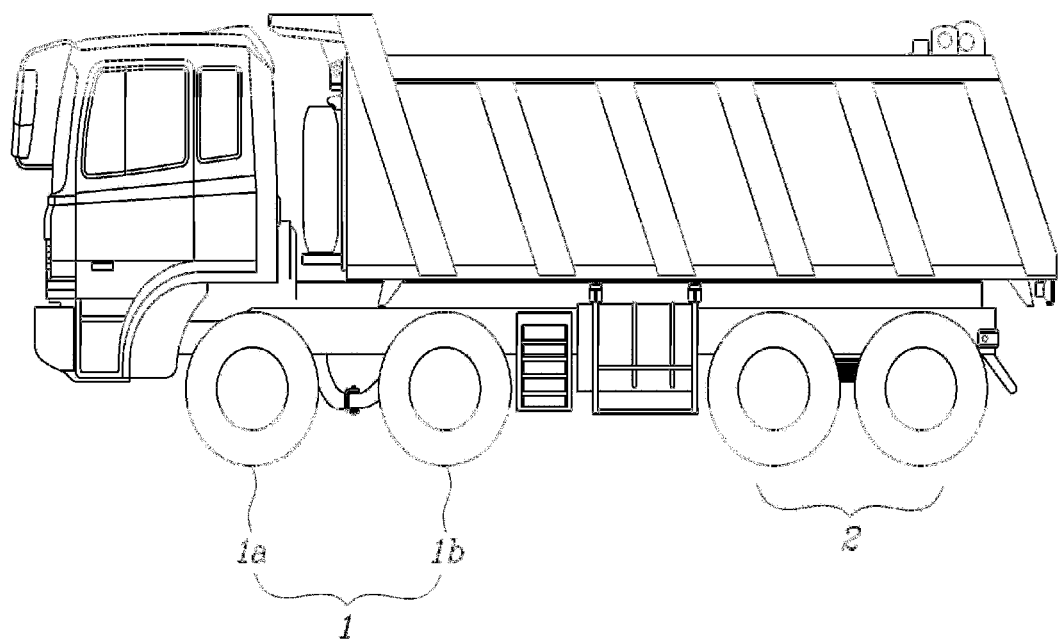
FIG. 1 is a side view of a truck having a front double-axle structure according to the related art.
Figure 2:
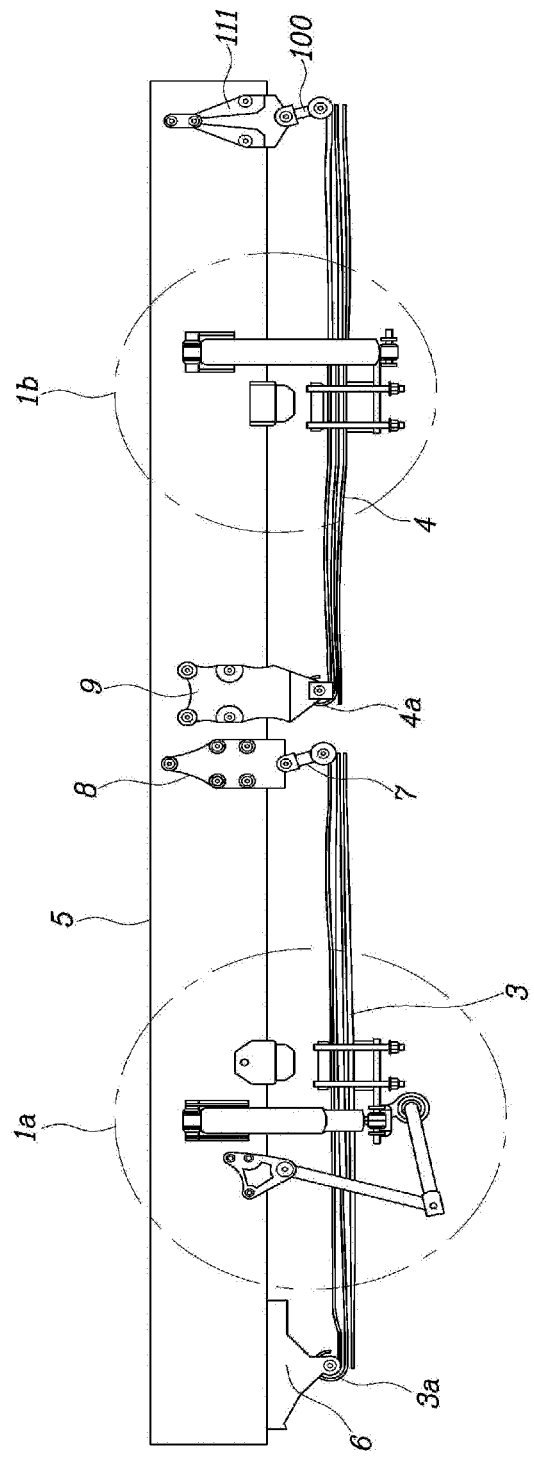
FIG. 2 is a view illustrating a conventional front double-axle suspension according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a suspension for a front double-axle vehicle according to an exemplary embodiment of the present invention will be described in detail with reference to the attached drawings. Reference now should be made to the drawings, in which the same reference numerals are used to designate the same components as those of the conventional technique.

Figure 3:
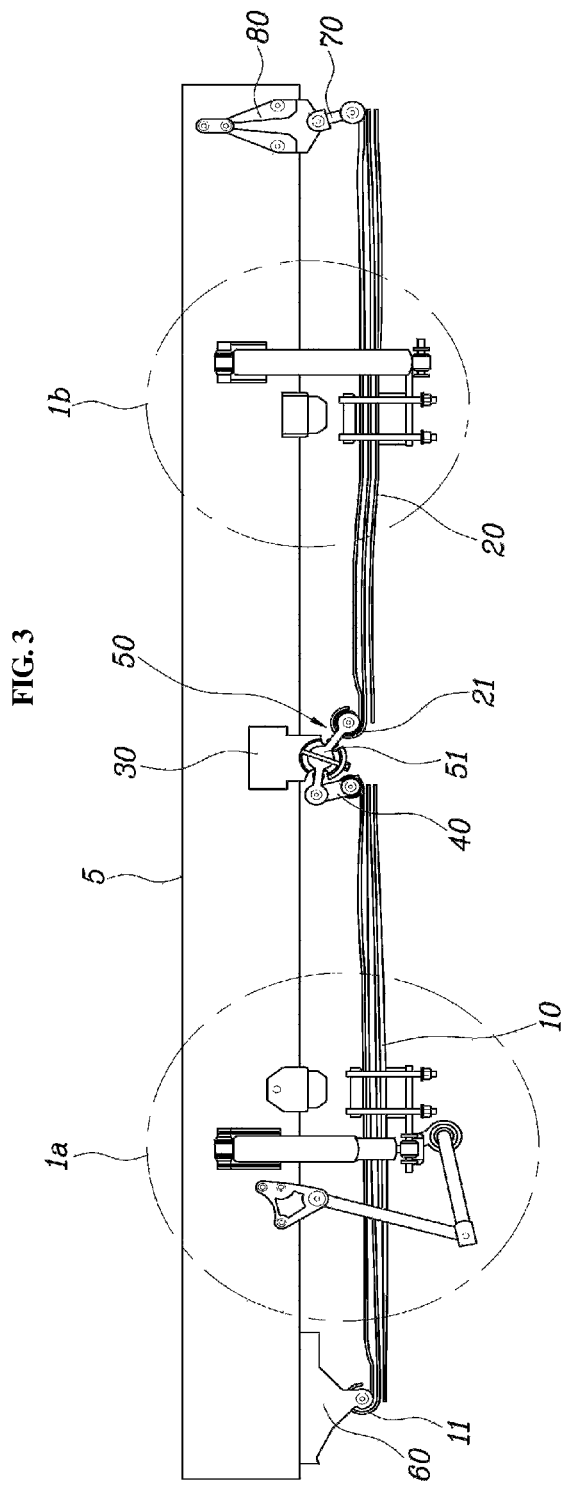
FIG. 3 is a view illustrating a front double-axle suspension according to an exemplary embodiment of the present invention.

In trucks, a front axle for a vehicle is an axle which is disposed at a front side of the vehicle and is capable of steering the vehicle, and a rear axle is a drive axle for transmission of power. As shown in FIG. 3, a front axle 1 for some trucks may be formed of two axles including a first front axle 1a and a second front axle 1b. The first front axle 1a and the second front axle 1b may be respectively coupled to a front leaf spring 10 and a rear leaf spring 20 which constitute the suspension.

Figure 4:
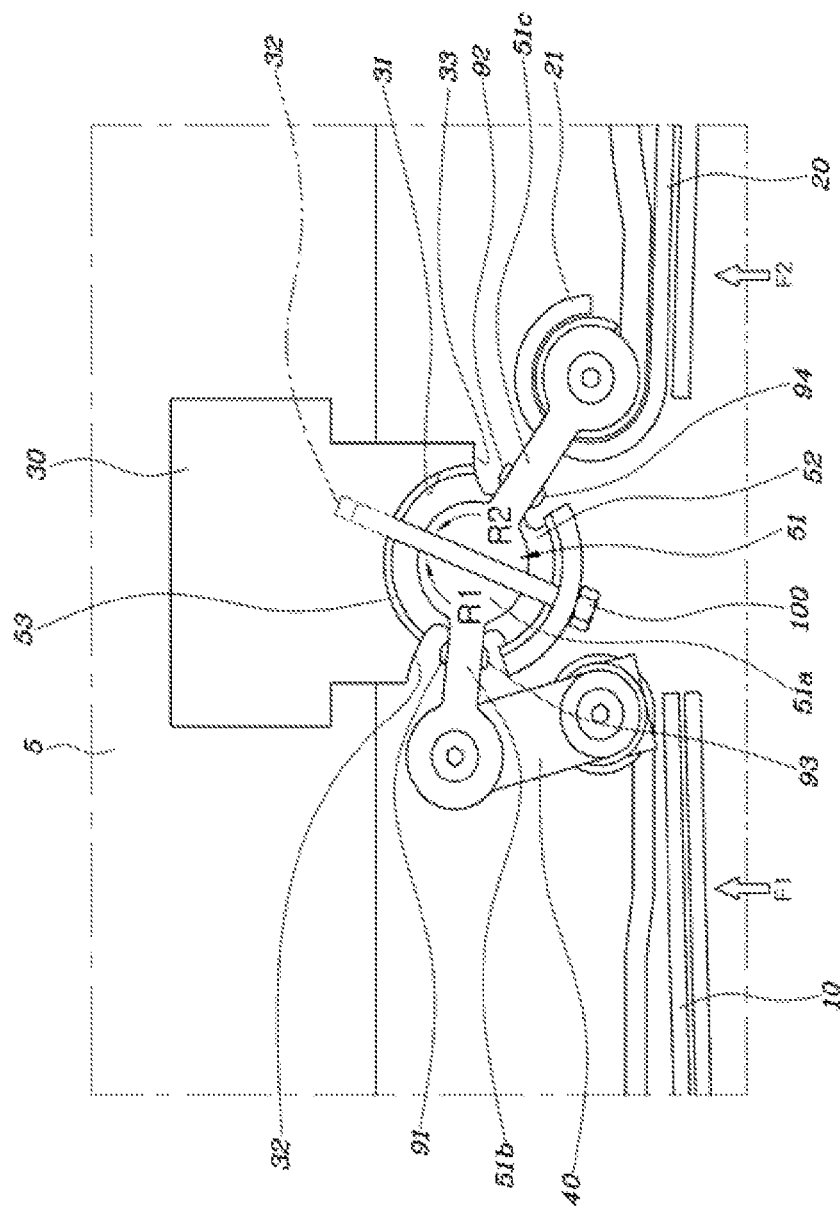
FIG. 4 is an enlarged view of a portion coupled with a connector of FIG. 3 according to an exemplary embodiment of the present invention.

As shown in FIGS. 3 and 4, a suspension for a front double-axle vehicle according to the exemplary embodiment of the present invention may include: the front leaf spring 10 and the rear leaf spring 20 respectively coupled to the first front axle 1a and the second front axle 1b; an intermediate bracket 30 disposed between the front leaf spring 10 and the rear leaf spring 20 and fixedly installed on a vehicle body frame 5; a front shackle 40 rotatably hinged at a first end thereof to a rear end of the front leaf spring 10; and a connector 50 rotatably hinged at a first end thereof to a second end of the front shackle 40, rotatably hinged at a second end thereof to a front eye end of the rear leaf spring 20, and rotatably hinged to the intermediate bracket 30 at an intermediate portion thereof between the first and second ends.

Further, an eye end 11 of the front leaf spring 10 that corresponds to a front end of the front leaf spring 10 may be rotatably hinged to a front bracket 60 coupled to the vehicle body frame 5. A rear end of the rear leaf spring 20 may be hinged to a first end of a rear shackle 70. A second end of the rear shackle 70 may be rotatably hinged to a rear bracket 80 coupled to the vehicle body frame 5. In other words, in the suspension according to the present invention the front shackle 40 coupled to the rear end of the front leaf spring 10 may be connected with the front eye end 21 of the rear leaf spring 20 by the connector 50, and the connector 50 may be rotatably coupled to the intermediate bracket 30 fixedly installed on the vehicle body frame 5.

For intermediate bracket 30, an upper end thereof may be fixedly coupled to the vehicle body frame 5; a coupling aperture 31 that couples with the connector 50 may be formed in a lower end of the intermediate bracket 30; and a front aperture 32 and a rear aperture 33 may be formed in the coupling aperture 31 to allow the front and rear apertures 32 and 33 to communicate with the exterior. The coupling aperture 31 may be formed in a lower portion of the vehicle body frame 5 to allow the coupling aperture 31 to pass through the vehicle body frame 5 in the left-right direction of the vehicle. The front aperture 32 and the rear aperture 33 pass through a circumferential surface surrounding the coupling aperture 31 and may communicate with the exterior.

The connector 50 may include a cross beam 51, a rubber bushing 52, and a bushing pipe 53. The cross beam 51 may include a central part 51a having a circular cross-section, a front rod 51b that protrudes forward from the central part 51a and that may be coupled to the front shackle 40, and a rear rod 51c that protrudes rearward from the central part 51a and that may be coupled to the eye end 21 of the rear leaf spring 20. The rubber bushing 52 may be coupled to an outer circumferential surface of the central part 51a. The bushing pipe 53 may be coupled to an outer circumferential surface of the rubber bushing 52. The bushing pipe 53 may be forcibly fitted into the coupling aperture 31 of the intermediate bracket 30. The front rod 51b and the rear rod 51c may be installed to respectively pass through the front aperture 32 and the rear aperture 33 of the intermediate bracket 30.

The suspension according to the present invention may further include upper stoppers 91 and 92 and lower stoppers 93 and 94 coupled to upper and lower surfaces of the front rod 51b and upper and lower surfaces of the rear rod 51c and thus, when the central part 51a rotates, some of the upper and lower stoppers 91, 92, 93 and 94 may come into contact with (e.g., abut) the intermediate bracket 30. In particular, when the central part 51a rotates in a direction of the arrow R1 shown in the drawing, the upper stopper 91 of the front rod 51b and the lower stopper 94 of the rear rod 51c come into contact with the intermediate bracket 30. When the central part 51a rotates in a direction of the arrow R2 shown in the drawing, the upper stopper 92 of the rear rod 51c and the lower stopper 93 of the front rod 51b come into contact with the intermediate bracket 30. The upper stoppers 91 and 92 and the lower stoppers 93 and 94 may be made of rubber material capable of absorbing impact and noise, thus limiting the maximum rotation angle of the cross beam 51, and preventing contact noise from being generated.

The suspension according to the present invention may further include an adjustment bolt 100 disposed on a side portion of the central part 51a and threadedly coupled to the intermediate bracket 30 across the coupling aperture 31. A threaded bore 32 for the coupling of the adjustment bolt 100 may be formed in the intermediate bracket 30. Based on the coupling force of the adjustment bolt 100, the stiffness of the rubber bushing 52 may be adjusted, whereby tuning in steerability, stability and ride comfort may be possible. Furthermore, two adjustment bolts 100 may be provided and coupled to the intermediate bracket 30 to be respectively disposed at left and right sides of the central part 51a. In other words, the central part 51a of the cross beam 51 may be installed between the two adjustment bolts 100 at a position spaced apart from the adjustment bolts 100.

Hereinafter, the operation of the suspension according to the exemplary embodiment of the present invention will be described.

When an axial load F1 is input from the first front axle 1a, the front leaf spring 10 may be moved upward (e.g., vertically). The front shackle 40 may be moved upward by the upward movement of the front leaf spring 10. Then, the cross beam 51 may be configured to rotate in the direction of the arrow R1 while elastically deforming the rubber bushing 52. Accordingly, as the axial load F1 input from the first front axle 1a is transmitted to the second front axle 1b through the rear leaf spring 20, the axial load F1 may be effectively dispersed. When an axial load F2 is input from the second front axle 1b, the rear leaf spring 20 may be moved upward. The front eye end 21 may be moved upward by the upward movement of the rear leaf spring 20. Then, the cross beam 51 may be configured to rotate in the direction of the arrow R2 while elastically deforming the rubber bushing 52. Accordingly, as the axial load F2 input from the second front axle 1b may be transmitted to the first front axle 1a through the rear leaf spring 20, the axial load F2 may be effectively dispersed.

As described above, in an exemplary embodiment of the present invention, for a commercial truck with a front axle including a first front axle 1a and a second front axle 1b, when an axial load is input from either the first front axle 1a or the second front axle 1b, the axial load is transmitted to the other axle to allow the axial load to be dispersed. Therefore, an axial load deviation between the first front axle 1a and the second front axle 1b may be reduced. Accordingly, the steerability, the safety and the drive stability may be enhanced. Moreover, a tire wear rate may be reduced thus allowing a tire replacement period to be extended. Furthermore, in the present invention, as a cross beam 51 that connects a front leaf spring 10 and a rear leaf spring 20 may be installed with a rubber bushing 52 to thus improve ride comfort.

Although the exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A suspension for a front double-axle vehicle, comprising:
    an intermediate bracket disposed between a front leaf spring coupled to a first front axle and a rear leaf spring coupled to a second front axle, wherein the intermediate bracket is fixedly installed on a vehicle body frame;
    a front shackle rotatably coupled at a first end thereof to a rear end of the front leaf spring; and
    a connector rotatably coupled at a first end thereof to a second end of the front shackle and at a second end thereof to a front eye end of the rear leaf spring, wherein the connector is rotatably coupled to the intermediate bracket at an intermediate portion thereof between the first and second ends,
    wherein the connector includes:
        a cross beam having a central part with a circular cross-section, a front rod that protrudes forward from the central part and is coupled to the front shackle, and a rear rod that protrudes rearward from the central part and is coupled to the front eye end of the rear leaf spring;
        a rubber bushing coupled to an outer circumferential surface of the central part; and
        a bushing pipe coupled to an outer circumferential surface of the rubber bushing,
    wherein the intermediate bracket is fixedly coupled at an upper end thereof to the vehicle body frame and includes in a lower end thereof a coupling aperture through which the connector is coupled to the intermediate bracket, and the coupling aperture includes a front aperture and a rear aperture that communicate with an exterior,
    wherein the bushing pipe is coupled to the coupling aperture of the intermediate bracket, and
    wherein the front rod and the rear rod are installed to respectively pass through the front aperture and the rear aperture of the intermediate bracket.

2. The suspension according to claim 1, further comprising:
    an upper stopper and a lower stopper coupled to upper and lower surfaces of the front rod and upper and lower surfaces of the rear rod and when the central part rotates, the upper stopper and the lower stopper come into contact with the intermediate bracket.

3. The suspension according to claim 1, further comprising:
    an adjustment bolt disposed on a side portion of the central part and threadedly coupled to the intermediate bracket across the coupling aperture.

4. The suspension according to claim 1, wherein when an axial load is input from either the first front axle or the second front axle, the central part is configured to rotate while the rubber bushing is elastically deformed, and the axial load is dispersed to the other front axle by rotation of the central part.

5. The suspension according to claim 4, when the axial load is input from the first front axle, the front leaf spring is moved upward and the front shackle is moved upward by the upward movement of the front leaf spring.

6. The suspension according to claim 4, wherein when the axial load is input from the second front axle, the rear leaf spring is moved upward and the front eye end is moved upward by the upward movement of the rear leaf spring.

* * * * *